(12) United States Patent
Yu (10) Patent No.: US 11,232,011 B2
(45) Date of Patent: Jan. 25, 2022

(54) METHOD AND APPARATUS FOR TESTING PERFORMANCE OF A PAGE CONTROL AND ELECTRONIC DEVICE

(71) Applicant: Zhuhai Juntian Electronic Technology Co., Ltd., Zhuhai (CN)

(72) Inventor: Zhenbei Yu, Zhuhai (CN)

(73) Assignee: ZHUHAI JUNTIAN ELECTRONIC TECHNOLOGY CO., LTD., Zhuhai (CN)

( * ) Notice: Subject to any disclaimer, the term of this patent is extended or adjusted under 35 U.S.C. 154(b) by 669 days.

(21) Appl. No.: 16/031,781

(22) Filed: Jul. 10, 2018

(65) Prior Publication Data
US 2019/0188109 A1    Jun. 20, 2019

(30) Foreign Application Priority Data
Dec. 19, 2017   (CN) .......................... 201711392040.5

(51) Int. Cl.
| | | |
|---|---|---|
| G06F 11/34 | (2006.01) | |
| G06F 11/36 | (2006.01) | |
| G06F 3/0485 | (2013.01) | |

(52) U.S. Cl.
CPC ........ G06F 11/3419 (2013.01); G06F 11/349 (2013.01); G06F 11/3414 (2013.01);
(Continued)

(58) Field of Classification Search
None
See application file for complete search history.

(56) References Cited

U.S. PATENT DOCUMENTS

| | | | |
|---|---|---|---|
| 8,983,946 B2 * | 3/2015 | Clary ..................... | H04L 43/06 707/727 |
| 9,626,197 B1 * | 4/2017 | Burciu .................. | G06F 40/146 |

(Continued)

FOREIGN PATENT DOCUMENTS

| | | |
|---|---|---|
| CN | 103136102 | 6/2013 |
| CN | 103294819 | 9/2013 |

(Continued)

OTHER PUBLICATIONS

Qi Alfred Chen, Haokun Luo, Sanae Rosen, Z. Morley Mao, Karthik Iyer, Jie Hui; "QoE Doctor: Diagnosing Mobile App QoE with Automated UI Control and Cross-layer Analysis;" Nov. 2014; ppg. 151-164 (Year: 2014).*

(Continued)

*Primary Examiner* — Arleen M Vazquez
*Assistant Examiner* — Terence E Stifter, Jr.
(74) *Attorney, Agent, or Firm* — Norton Rose Fulbright US LLP (57) ABSTRACT

A method for testing performance of a page control comprising: testing each of multiple evaluation dimensions for a page control, the multiple evaluation dimensions comprising at least one of an FPS (Frames Per Second) at the time of scrolling a page, an FPS at the time of opening a message, the number of times of adding a message, an FPS at the time of cutting an image, an FPS at the time of adding a message, and the number of times of rendering a page; determining a test result of each of the evaluation dimensions; determining operation performance of the page control according to the test result of each of the evaluation dimensions. Also disclosed is an apparatus for testing performance of a page control, and an electronic device. Operation performance of the page control can be tested in multiple aspects and the credibility of performance evaluation results is improved.

18 Claims, 4 Drawing Sheets

(52) U.S. Cl.
CPC ........ *G06F 11/3692* (2013.01); *G06F 3/0485* (2013.01); *G06F 2201/865* (2013.01)

(56) References Cited

U.S. PATENT DOCUMENTS

| | | | |
|---|---|---|---|
| 2015/0019715 A1* | 1/2015 | Ronen | H04L 43/0852 709/224 |
| 2015/0106497 A1 | 4/2015 | Kaneko et al. | |
| 2016/0224092 A1 | 8/2016 | Weitzman et al. | |
| 2019/0079850 A1* | 3/2019 | Zhang | G06F 8/71 |

FOREIGN PATENT DOCUMENTS

| | | |
|---|---|---|
| CN | 104731543 | 6/2015 |
| CN | 104978668 | 10/2015 |
| CN | 106844214 | 6/2017 |
| CN | 107193515 | 9/2017 |

OTHER PUBLICATIONS

Office Action issued in Corresponding Chinese Application No. 201711392040.5, dated Sep. 29, 2020 (English translation provided).

Office Action issued in Corresponding Chinese Application No. 201711392040.5, dated Apr. 28, 2021 (English Translation provided).

* cited by examiner

METHOD AND APPARATUS FOR TESTING PERFORMANCE OF A PAGE CONTROL AND ELECTRONIC DEVICE

CROSS REFERENCE TO RELATED APPLICATION

The present application claims the priority to a Chinese patent application No. 201711392040.5, filed with the State Intellectual Property Office of People's Republic of China on Dec. 19, 2017 and entitled "METHOD AND APPARATUS FOR TESTING PERFORMANCE OF A PAGE CONTROL AND ELECTRONIC DEVICE", which is hereby incorporated into the present application by reference in its entirety.

TECHNICAL FIELD

The present disclosure relates to the field of computers and smart mobile phones, and particularly to a method and apparatus for testing performance of a page control and an electronic device.

BACKGROUND

With the popularization of smart mobile phones, there are more and more mobile phone manufacturers. It thus becomes increasingly challenging for the adaptation of client applications. Therefore, most applications are now developed with HTML5 ($5^{th}$ Generation Hypertext Markup Language), and a page control such as WebView is used on a client device for loading and presentation. As such, the speed of loading HTML5 elements and the capability of rendering HTML5 elements of a page control are crucial factors affecting the display effect of the page on a mobile phone. For a high-quality displaying effect of the page, the requirement for the operation performance of a page control may vary depending on different operations performed on the page by a user. As a result, a test result obtained by testing a page control in a single dimension may not be able to reflect the operation performance of the page control, thus producing an evaluation result of a low credibility.

SUMMARY

Embodiments of the present disclosure provide a method and apparatus for testing performance of a page control and an electronic device, which may comprehensively test the operation performance of the page control, and improve credibility of the test result.

A first aspect of the present disclosure provides a method for testing performance of a page control, comprising:

testing each of multiple evaluation dimensions for a page control, the multiple evaluation dimensions comprising at least one of an FPS (Frames Per Second) at the time of scrolling a page, an FPS at the time of opening a message, the number of times of adding a message, an FPS at the time of cutting an image, an FPS at the time of adding a message, and the number of times of rendering a page;

determining a test result of each of the evaluation dimensions; and determining operation performance of the page control according to the test result of each of the evaluation dimensions.

Wherein, determining operation performance of the page control according to the test result of each of the evaluation dimensions comprises:

calculating a comprehensive score of the page control according to the test result of each of the evaluation dimensions; and determining the operation performance of the page control according to the comprehensive score.

Wherein, calculating a comprehensive score of the page control according to the test result of each of the evaluation dimensions comprises:

calculating a linear weighted sum of the test results of the evaluation dimensions as the comprehensive score of the page control.

Wherein, determining the operation performance of the page control according to the comprehensive score comprises:

determining the operation performance of the page control to be excellent, if the comprehensive score of the page control exceeds a preset threshold.

Wherein, determining the test result of each of the evaluation dimensions comprises:

obtaining a first duration from the beginning of the scrolling of a page to the end of the scrolling of the page, and a first number of times that the page is refreshed for the first duration; and calculating a quotient of the first number of times that the page is refreshed divided by the first duration as the test result of the FPS at the time of scrolling a page.

Wherein, determining the test result of each of the evaluation dimensions comprises:

obtaining a second duration from the opening of a message to the closing of the message, and a second number of times that the page is refreshed for the second duration; and calculating a quotient of the second number of times that the page is refreshed divided by the second duration as the test result of the FPS at the time of opening a message.

Wherein, determining the test result of each of the evaluation dimensions comprises:

obtaining a third duration from the beginning of the adding of a message to the displaying of the message; and calculating a quotient of a first preset duration divided by the third duration as the test result of the number of times of adding a message.

Wherein, determining the test result of each of the evaluation dimensions comprises:

obtaining a fourth duration from the beginning of the selection of a target image to the completing of the cutting of the target image, and a third number of times that the page is refreshed for the fourth duration; and calculating a quotient of the third number of times that the page is refreshed divided by the fourth duration as the test result of the FPS at the time of cutting an image.

Wherein, determining the test result of each of the evaluation dimensions comprises:

obtaining a fifth duration from the beginning of the reading of data of the page to the completing of the rendering of the page; and calculating a quotient of a second preset duration divided by the fifth duration as the test result of the number of times of rendering a page.

Wherein, determining the test result of each of the evaluation dimensions comprises:

obtaining a sixth duration from the beginning of the adding of a message to the displaying of the message, and a fourth number of times that the page is refreshed for the sixth duration; and calculating a quotient of the fourth number of times that the page is refreshed divided by the sixth duration as the test result of the FPS at the time of adding a message.

Correspondingly, a second aspect of the present disclosure provides an apparatus for testing performance of a page control, comprising:

a testing module configured to test each of multiple evaluation dimensions for a page control, the multiple evaluation dimensions comprising at least one of an FPS (Frames Per Second) at the time of scrolling a page, an FPS at the time of opening a message, the number of times of adding a message, an FPS at the time of cutting an image, an FPS at the time of adding a message, and the number of times of rendering a page;

a determining module configured to determine a test result of each of the evaluation dimensions; and an evaluating module configured to determine operation performance of the page control according to the test result of each of the evaluation dimensions.

Wherein, the evaluating module is further configured to:

calculate a comprehensive score of the page control according to the test result of each of the evaluation dimensions; and determine the operation performance of the page control according to the comprehensive score.

Wherein, the evaluating module is further configured to:

calculate a linear weighted sum of the test results of the evaluation dimensions as the comprehensive score of the page control.

Wherein, the evaluating module is further configured to:

determine the operation performance of the page control to be excellent, if the comprehensive score of the page control exceeds a preset threshold.

Wherein, the determining module is further configured to:

obtain a first duration from the beginning of the scrolling of a page to the end of the scrolling of the page, and a first number of times that the page is refreshed for the first duration; and calculate a quotient of the first number of times that the page is refreshed divided by the first duration as the test result of the FPS at the time of scrolling a page.

Wherein, the determining module is further configured to:

obtain a second duration from the opening of a message to the closing of the message, and a second number of times that the page is refreshed for the second duration; and calculate a quotient of the second number of times that the page is refreshed divided by the second duration as the test result of the FPS at the time of opening a message.

Wherein, the determining module is further configured to:

obtain a third duration from the beginning of the adding of a message to the displaying of the message; and calculate a quotient of a first preset duration divided by the third duration as the test result of the number of times of adding a message.

Wherein, the determining module is further configured to:

obtain a fourth duration from the beginning of the selection of a target image to the completing of the cutting of the target image, and a third number of times that the page is refreshed for the fourth duration; and calculate a quotient of the third number of times that the page is refreshed divided by the fourth duration as the test result of the FPS at the time of cutting an image.

Wherein, the determining module is further configured to:

obtain a fifth duration from the beginning of the reading of data of the page to the completing of the rendering of the page; and calculate a quotient of a second preset duration divided by the fifth duration as the test result of the number of times of rendering a page.

Wherein, the determining module is further configured to:

obtain a sixth duration from the beginning of the adding of a message to the displaying of the message, and a fourth number of times that the page is refreshed for the sixth duration; and calculate a quotient of the fourth number of times that the page is refreshed divided by the sixth duration as the test result of the FPS at the time of adding a message.

Correspondingly, a third aspect of the present disclosure provides an electronic device, comprising: a processor, a memory, a communication interface and a bus;

the processor, the memory and the communication interface are connected through the bus to communicate with each other;

the memory is configured to store executable program codes; and the processor is configured to execute a program corresponding to the executable program codes by reading the executable program codes stored in the memory, to perform the method for testing performance of a page control provided by the first aspect of the present disclosure.

Correspondingly, embodiments of the present disclosure provide a storage medium storing an application program which, when being executed, performs the method for testing performance of a page control provided by the first aspect of the present disclosure.

Correspondingly, embodiments of the present disclosure provide an application which, when being executed, performs the method for testing performance of a page control provided by the first aspect of the present disclosure.

In the embodiments of the present disclosure, each of the multiple evaluation dimensions for the page control is tested. The multiple evaluation dimensions may comprise at least one of an FPS (Frames Per Second) at the time of scrolling a page, an FPS at the time of opening a message, the number of times of adding a message, an FPS at the time of cutting an image, an FPS at the time of adding a message, and the number of times of rendering a page. The test result of each evaluation dimension is determined. The operation performance of the page control is determined according to the test result of each evaluation dimension. The credibility of the evaluation result is improved by testing the page control in multiple dimensions and using the test result of each dimension to comprehensively evaluate the operation performance of the page control.

BRIEF DESCRIPTION OF THE DRAWINGS

In order to more clearly describe the embodiments of the present application and the technical solutions in the prior art, drawings that need to be used in embodiments and the prior art will be briefly described below. Obviously, the drawings provided below are for only some embodiments of the present application; those skilled in the art can also obtain other drawings based on these drawings without any creative efforts.

DETAILED DESCRIPTION

Technical solutions in embodiments of the present disclosure will be described clearly and fully with reference to figures in embodiments of the present disclosure. Obviously, the described embodiments are only some, and not all, of the embodiments of the present application. All other embodiments obtained based on the embodiments of the present application by those skilled in the art without any creative efforts fall into the scope of protection defined by the present application.

Figure 1:
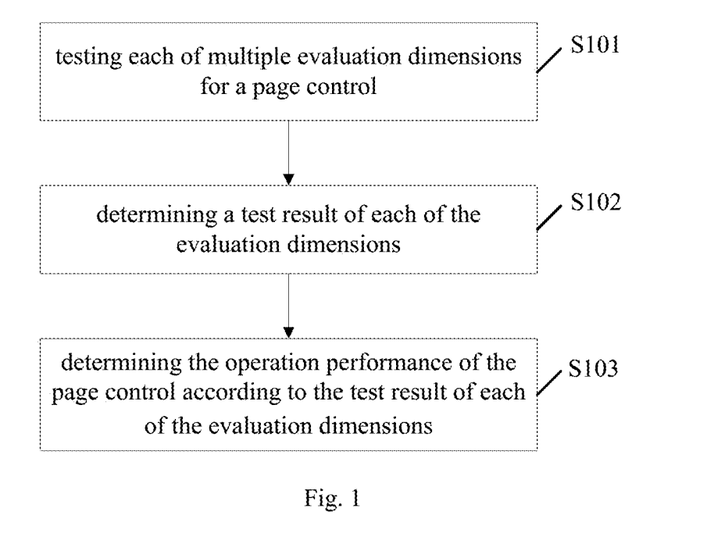
FIG. 1 is a flow chart of a method for testing performance of a page control according to an embodiment of the present disclosure.

Referring to FIG. 1, it illustrates a flow chart of a method for testing performance of a page control according to an embodiment of the present disclosure. As shown in FIG. 1, the method in the embodiment of the present disclosure comprises S101-S103.

S101: testing each of multiple evaluation dimensions for a page control. The multiple evaluation dimensions may comprise at least one of: an FPS (Frames Per Second) at the time of scrolling a page, an FPS at the time of opening a message, the number of times of adding a message, an FPS at the time of cutting an image, an FPS at the time of adding a message, and the number of times of rendering a page. The testing method may comprises the following optional ways.

In a first optional way, the FPS at the time of scrolling a page is tested. The test comprises: recording, upon the completion of page loading, the currently displayed content on the screen as initial display content of the screen; scrolling the page up or down; clicking, after the page has been scrolled a distance or for a period of time, on any position of the screen to stop scrolling the page; scrolling the page in a reverse direction; and stopping scrolling the page when the screen is currently displaying a content that is consistent with the initial display content of the screen, wherein the distance or the period of time may be of any length.

Figure 2:
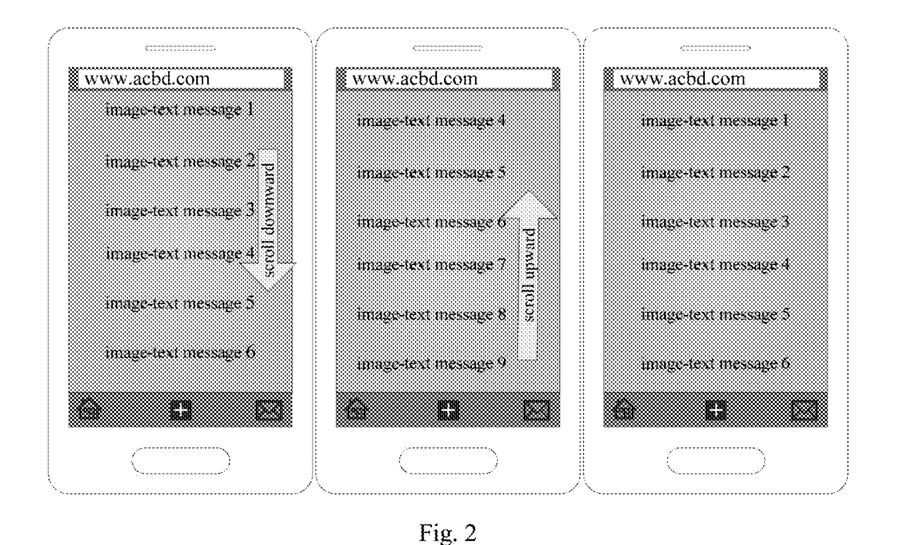
FIG. 2 is a schematic diagram of a method of scrolling a page according to an embodiment of the present disclosure.

For example, FIG. 2 shows a complete process of page scrolling during the test of the FPS at the time of scrolling a page. Image-text messages 1-6 are initially displayed on the screen. The page is then scrolled downward to view other image-text messages included in the page until an image-text message 9 is displayed on the screen. The downward scrolling is hereby stopped, and the page is scrolled back until the image-text messages 1-6 are displayed again on the screen.

In a second optional way, the FPS at the time of opening a message is tested. The test comprises: selecting, after the scrolling of the page is stopped, one message from all the image-text messages included in the page; clicking on the selected message to display the detailed content of the selected message in a window with animation; and clicking on the window with animation to close the selected message after the detailed content is completely displayed.

For example, a message is selected from a list of image-text messages in the current page, the content of which is a section of video information; the video begins to play after the clicking on the selected message, and the selected message is closed by clicking on the video window, after the video is played completely.

In a third optional way, the FPS at the time of cutting an image is tested. The test comprises: selecting one from all the images included in the page as a target image to be cut, by long-pressing this image. The long-pressing may refer to that the image is pressed for 1 second. At this time, an image editing interface may be entered. An image cutting mode may then be entered by long-pressing the target image. In the imaging cutting mode, an image cutting scheme is determined, and the target image is cut in response to the clicking on a cutting button. A new image obtained by the cutting is processed, for example, stored or discarded. Finally, the image editing interface is closed in response to the clicking on the exit button.

Figure 3A:
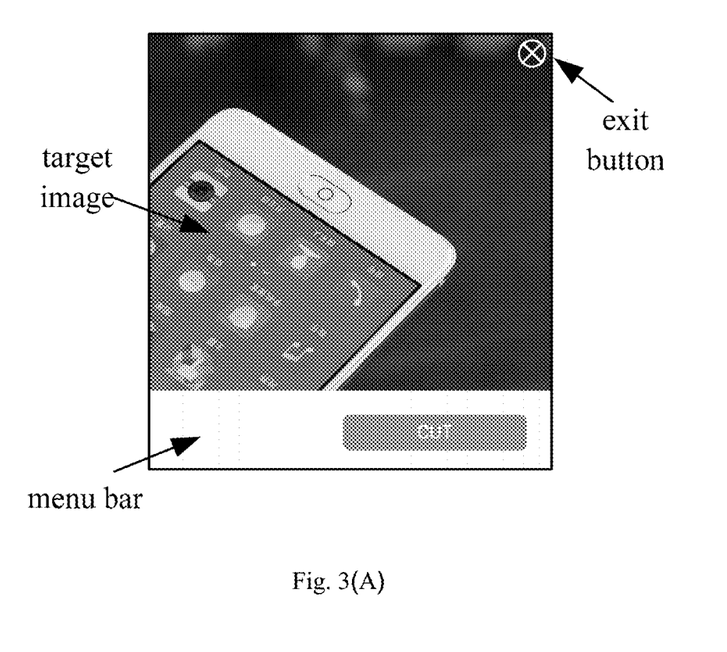
FIG. 3(A) is a schematic diagram of an image editing interface according to an embodiment of the present disclosure.
Figure 3B:
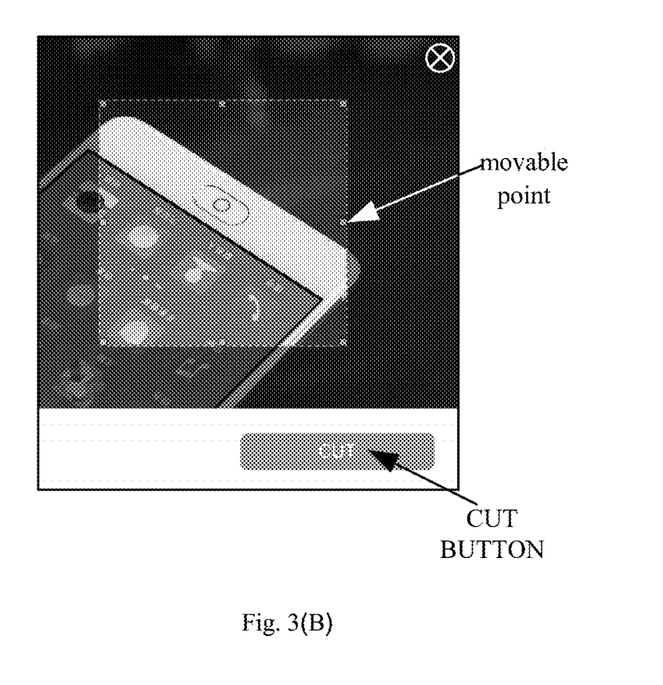
FIG. 3(B) is a schematic diagram of a method for image cutting according to an embodiment of the present disclosure.

For example, an image editing interface of the page is entered while the target image is determined. As shown in FIG. 3(A), the image editing interface comprises a target image, a menu bar and an exit button. Then, the target image is long-pressed to enter the image cutting mode. As shown in FIG. 3(B), a highlighted rectangular area appears on the target image, and eight movable points are distributed along the inner edges of the rectangular area. The eight movable points may be respectively moved to determine the cutting scheme, such that the image part displayed in the highlighted area will serve as the new image obtained from the cutting. A CUT button on the image editing interface is clicked after the image in the highlighted area is determined as meeting a cutting expectation, so that a cutting operation on the target image is performed. The new image is then stored. Finally, the exit button at the right upper corner of the image cutting interface is clicked to close the image editing interface is closed.

Figure 4:
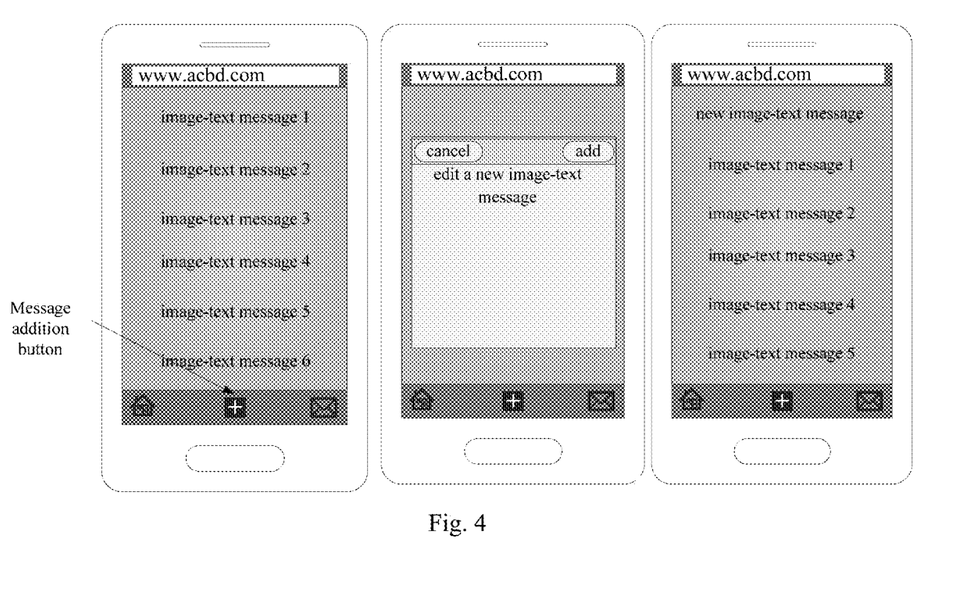
FIG. 4 is a schematic diagram of a method of adding a message according to an embodiment of the present disclosure.

In a fourth optional way, the FPS at the time of adding a message and the number of times of adding a message are tested. The test comprises, as shown in FIG. 4, clicking a message addition button for adding a message onto the page, so as to enter a message editing interface of the page; inputting, into a message editing box, message content, which may be one image, a section of text or video; and then clicking, after the message content has been input, the "addition" button at the right upper corner of the message editing interface, and finally displaying the added message at the top position of the page.

In a fifth optional way, the number of times of rendering a page is tested. The test comprises: using AJAX technology to read JSON (JavaScript Object Notation) data of the page; and rendering the page, wherein the rendering process is a process of converting a page represented in codes into a page in image-text form and displaying the page. The operation for rendering a page may be implemented by a browser. A successful display of the page on the screen indicates the end of rendering the page.

It is appreciated that to avoid testing errors due to human factors, all the above operations (e.g., scrolling, clicking and long-pressing) are implemented by simulated clicking through assisting functions of the system.

S102: determining the test result of each of the evaluation dimensions, wherein determining the test result comprises the following several optional methods.

In a first optional method, the test result of the FPS at the time of scrolling a page is determined. The method comprises: recording a duration from the beginning of the scrolling of a page to the end of the scrolling of the page in the testing process; obtaining, through an API (Application Programming Interface), the number of times that the page is refreshed in the duration from the beginning of the scrolling of a page to the end of the scrolling of the page; and calculating the quotient of the number of times that the page is refreshed divided by the duration as the test result of the FPS at the time of scrolling a page.

For example, in the process of scrolling a page as shown in FIG. 2, the recorded duration from the beginning of the scrolling of the page to the end of the scrolling of the page is 2000 ms, and the number of times that the page is refreshed in the duration from the beginning of the scrolling of the page to the end of the scrolling of the page, which is obtained through the API of window.requestAnimation-Frame in JavaScript, is 60. As such, the test result of FPS at the time of scrolling a page is 60/(2000/1000)=30 frames per second (fps).

In a second optional method, the test result of the FPS at the time of opening a message is determined. The method comprises: recording a duration from the clicking on a selected message to the closing of the selected message in the test process; obtaining, through an API, the number of times that the page is refreshed in that duration from the clicking on a selected message to the closing of the selected message, and calculating the quotient of the number of times that the page is refreshed divided by the duration as the test result of the FPS at the time of opening a message.

For example, the recorded duration from the clicking on a selected message to the closing of the selected message is 1500 ms, and the number of times that the page is refreshed in the duration from the clicking on a selected message to the returning of the selected message to a state before the clicking, which is obtained through the API of window.RequestAnimationFrame in JavaScript, is 60. Thus, the test result of FPS at the time of opening a message is 60/(1500/1000)=40 fps.

In a third optional method, the test result of the FPS at the time of cutting an image is determined. The method comprises: recording a duration from the long-pressing on the target image to the closing of the image editing interface in the image cutting process; obtaining, through an API, the number of times that the page is refreshed in the duration from the clicking on the target image to the closing of the image editing interface, and calculating the quotient of the number of times that the page is refreshed divided by the duration as the test result of the FPS at the time of cutting an image. For example, the recorded duration from the clicking on the target image to the closing of the image editing interface is 1020 ms, and the page is refreshed 40 times in the duration of 1020 ms. Thus, the test result of the FPS at the time of cutting an image is 40/(1020/1000)=39.2 fps.

In a fourth optional method, the test result of FPS at the time of adding a message and the number of times of adding a message is determined. The method comprises: recording a duration from the clicking on a message addition button to the displaying of the added message on the top of the page in the testing process; obtaining, through an API, the number of times that the page is refreshed in the duration from the clicking on a message addition button to the displaying of the added message on the top of the page; calculating the quotient of the number of times that the page is refreshed divided by the duration as the test result of the FPS at the time of adding a message; and calculating the quotient of a first preset duration divided by the recorded duration as the test result of the number of times of adding a message, wherein the first preset duration may be any predetermined duration, such as 10 ms or 20 ms.

In the fifth optional method, the test result of the number of times of rendering a page is determined. The method comprises: recording the duration from the reading of JSON data of the page to the end of the rendering of the page, and calculating the quotient of the second preset duration divided by the recorded duration as the test result of the number of times of rendering a page, wherein the second preset duration may be any predetermined duration, such as 100 ms or 80 ms.

S103: determining the operation performance of the page control according to the test result in each of the evaluation dimensions.

In specific implementation, the importance of each of the evaluation dimensions may be determined. In a comprehensive evaluation of the operation performance of the page, the proportion of each evaluation dimension in the evaluation result is determined according to the importance.

In the embodiment of the present disclosure, each of the multiple evaluation dimensions for the page control is tested. The multiple evaluation dimensions may comprise at least one of an FPS (Frames Per Second) at the time of scrolling a page, an FPS at the time of opening a message, the number of times of adding a message, an FPS at the time of cutting an image, an FPS at the time of adding a message, and the number of times of rendering a page. The test result of each evaluation dimension is determined. The operation performance of the page control is determined according to the test result of each evaluation dimension. The credibility of the evaluation result is improved by testing the page control in multiple dimensions and using the test result of each dimension to comprehensively evaluate the operation performance of the page control.

Figure 5:
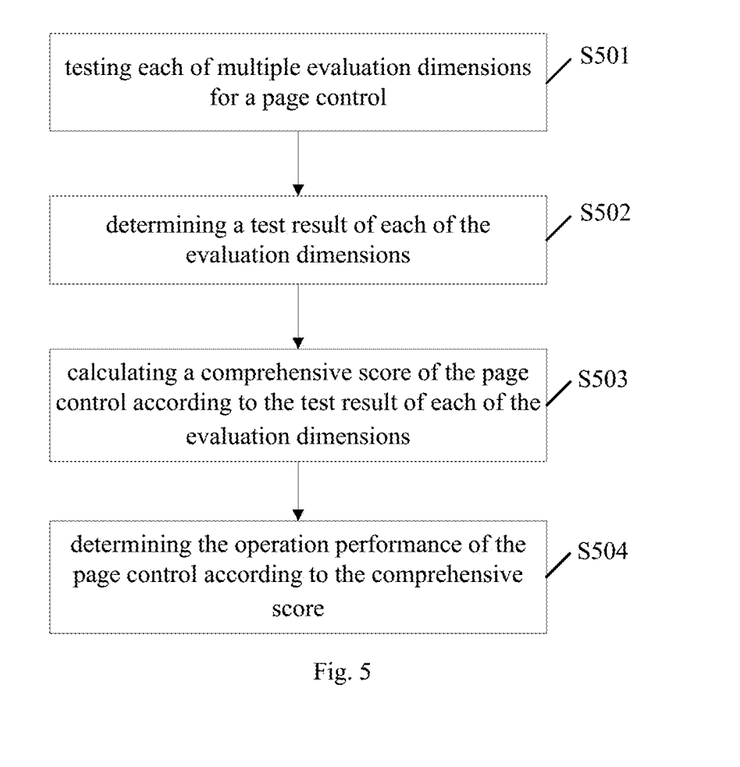
FIG. 5 is a flow chart of another method for testing performance of a page control according to an embodiment of the present disclosure.

Referring to FIG. 5, FIG. 5 provides a flow chart of another method for testing the performance of a page control. As shown in FIG. 5, the embodiment of the present disclosure comprises:

S501: testing each of multiple evaluation dimensions for a page control. The multiple evaluation dimensions may comprise at least one of: an FPS (Frames Per Second) at the time of scrolling a page, an FPS at the time of opening a message, the number of times of adding a message, an FPS at the time of cutting an image, an FPS at the time of adding a message, and the number of times of rendering a page. The testing method may comprises the following optional ways.

In a first optional way, the FPS at the time of scrolling a page is tested. The test comprises: recording, upon the completion of page loading, the currently displayed content on the screen as initial display content of the screen; scrolling the page up or down; clicking, after the page has been scrolled a distance or for a period of time, on any position of the screen to stop scrolling the page; scrolling the page in a reverse direction; and stopping scrolling the page when the screen is currently displaying a content that is consistent with the initial display content of the screen, wherein the distance or the period of time may be of any length.

For example, FIG. 2 shows a complete process of page scrolling during the test of the FPS at the time of scrolling a page. Image-text messages 1-6 are initially displayed on the screen. The page is then scrolled downward to view other image-text messages included in the page until an image-text message 9 is displayed on the screen. The downward scrolling is hereby stopped, and the page is scrolled back until the image-text messages 1-6 are displayed again on the screen.

In a second optional way, the FPS at the time of opening a message is tested. The test comprises: selecting, after the scrolling of the page is stopped, one message from all the image-text messages included in the page; clicking on the selected message to display the detailed content of the selected message in a window with animation; and clicking on the window with animation to close the selected message after the detailed content is completely displayed.

For example, a message is selected from a list of image-text messages in the current page, the content of which is a section of video information; the video begins to play after the clicking on the selected message, and the selected message is closed by clicking on the video window, after the video is played completely.

In a third optional way, the FPS at the time of cutting an image is tested. The test comprises: selecting one from all the images included in the page as a target image to be cut, by long-pressing this image. The long-pressing may refer to that the image is pressed for 1 second. At this time, an image editing interface may be entered. An image cutting mode may then be entered by long-pressing the target image again. In the imaging cutting mode, an image cutting scheme is determined, and the target image is cut in response to the clicking on a cutting button. A new image obtained by the cutting is processed, for example, stored or discarded. Finally, the image editing interface is closed in response to the clicking on the exit button.

For example, an image editing interface of the page is entered while the target image is determined. As shown in FIG. 3(A), the image editing interface comprises a target image, a menu bar and an exit button. Then, the target image is long-pressed to enter the image cutting mode. As shown in FIG. 3(B), a highlighted rectangular area appears on the target image, and eight movable points are distributed along the inner edges of the rectangular area. The eight movable points may be respectively moved to determine the cutting scheme, such that the image part displayed in the highlighted area will serve as the new image obtained from the cutting. A CUT button on the image editing interface is clicked after the image in the highlighted area is determined as meeting a cutting expectation, so that a cutting operation on the target image is performed. The new image is then stored. Finally, the exit button at the right upper corner of the image cutting interface is clicked to close the image editing interface is closed.

In a fourth optional way, the FPS at the time of adding a message and the number of times of adding a message are tested. The test comprises, as shown in FIG. 4, clicking a message addition button for adding a message onto the page, so as to enter a message editing interface of the page; inputting, into a message editing box, message content, which may be one image, and a section of text or video; and then clicking, after the message content has been input, the "addition" button at the right upper corner of the message editing interface, and finally displaying the added message at the top position of the page.

In a fifth optional way, the number of times of rendering a page is tested. The test comprises: using AJAX technology to read JSON (JavaScript Object Notation) data of the page; and rendering the page, wherein the rendering process is a process of converting a page represented in codes into a page in image-text form and displaying the page. The operation for rendering a page may be implemented by a browser. A successful display of the page on the screen indicates the end of rendering the page.

It is appreciated that to avoid testing errors due to human factors, all the above operations (e.g., scrolling, clicking and long-pressing) are implemented by simulated clicking through assisting functions of the system.

S502: determining the test result of each of the evaluation dimensions, wherein determining the test result comprises the following several optional methods.

In a first optional method, the test result of the FPS at the time of scrolling a page is determined. The method comprises: recording a duration from the beginning of the scrolling of a page to the end of the scrolling of the page in the testing process; obtaining, through an API (Application Programming Interface), the number of times that the page is refreshed in the duration from the beginning of the scrolling of a page to the end of the scrolling of the page; and calculating the quotient of the number of times that the page is refreshed divided by the duration as the test result of the FPS at the time of scrolling a page.

For example, in the process of scrolling a page as shown in FIG. 2, the recorded duration from the beginning of the scrolling of the page to the end of the scrolling of the page is 2000 ms, and the number of times that the page is refreshed in the duration from the beginning of the scrolling of the page to the end of the scrolling of the page, which is obtained through the API of window.requestAnimationFrame in JavaScript, is 60. As such, the test result of FPS at the time of scrolling a page is 60/(2000/1000)=30 frames per second (fps).

In a second optional method, the test result of the FPS at the time of opening a message is determined. The method comprises: recording the duration from the clicking on a selected message to the closing of the selected message in the test process; obtaining, through an API, the number of times that the page is refreshed in that duration from the clicking on a selected message to the closing of the selected message, and calculating the quotient of the number of times that the page is refreshed divided by the duration as the test result of the FPS at the time of opening a message.

For example, the recorded duration from the clicking on a selected message to the closing of the selected message is 1500 ms, and the number of times that the page is refreshed in the duration from the clicking on a selected message to the returning of the selected message to a state before the clicking, which is obtained through the API of window.RequestAnimationFrame in JavaScript, is 60. Thus, the test result of FPS at the time of opening a message is 60/(1500/1000)=40 fps.

In a third optional method, the test result of the FPS at the time of cutting an image is determined. The method comprises: recording the duration from the long-pressing on the target image to the closing of the image editing interface in the image cutting process; obtaining, through an API, the number of times that the page is refreshed in the duration from the clicking on the target image to the closing of the image editing interface, and calculating the quotient of the number of times that the page is refreshed divided by the duration as the test result of the FPS at the time of cutting an image. For example, the recorded duration from the clicking on the target image to the closing of the image editing interface is 1020 ms, and the page is refreshed 40 times in the duration of 1020 ms. Thus, the test result of the FPS at the time of cutting an image is 40/(1020/1000)=39.2 fps.

In a fourth optional method, the test result of FPS at the time of adding a message and the number of times of adding a message is determined. The method comprises: recording the duration from the clicking on a message addition button to the displaying of the added message on the top of the page in the testing process; obtaining, through an API, the number of times that the page is refreshed in the duration from the clicking on a message addition button to the displaying of the added message on the top of the page; calculating the quotient of the number of times that the page is refreshed divided by the duration as the test result of the FPS at the time of adding a message; and calculating the quotient of a first preset duration divided by the recorded duration as the test result of the number of times of adding a message, wherein the first preset duration may be any predetermined duration, such as 10 ms or 20 ms.

In the fifth optional method, the test result of the number of times of rendering a page is determined. The method comprises: recording the duration from the reading of JSON data of the page to the end of the rendering of the page, and calculating the quotient of the second preset duration divided by the recorded duration as the test result of the number of times of rendering a page, wherein the second preset duration may be any predetermined duration, such as 100 ms or 80 ms.

S503: calculating a comprehensive score of the page control according to the test result of each of the evaluation dimensions.

In a specific implementation, a linear weighted sum of the test results of the evaluation dimensions may be calculated, wherein a sum of the weights of all the evaluation dimensions equals to 1. The magnitude of the weight of each evaluation dimension is determined according to the importance thereof. The weights of the FPS at the time of scrolling a page, FPS at the time of opening a message, the number of times of adding a message, FPS at the time of cutting an image, FPS at the time of adding a message, and the number of times of rendering a page may be respectively set as 0.25, 0.25, 0.15, 0.15, 0.1 and 0.1. The product of the calculated linear weighted sum and 1000 is taken as the comprehensive score of the page control.

For example, the test results of the FPS at the time of scrolling a page, FPS at the time of opening a message, the number of times of adding a message, FPS at the time of cutting an image, FPS at the time of adding a message, and the number of times of rendering a page are respectively 40 fps, 35 fps, 30, 45 fps, 42 fps and 25. The linear weighted sum is:

$$40*0.25+35*0.25+30*0.15+45*0.15+42*0.1+25*0.1=36.7$$

The comprehensive score of the page control is:

$$36.7*1000=36700$$

Optionally, a weighted average of the test results of all the evaluation dimensions may be calculated, wherein the sum of weights of all the evaluation dimensions does not exceed the total number of the evaluation dimensions. The magnitude of the weight of each of the evaluation dimensions is determined according to its importance. The weights of the FPS at the time of scrolling a page, FPS at the time of opening a message, the number of times of adding a message, FPS at the time of cutting an image, FPS at the time of adding a message, and the number of times of rendering a page may be respectively set as 1.25, 1.25, 1, 1, 0.75 and 0.75. The product of the calculated weighted average and 1000 is taken as the comprehensive score of the page control.

For example, the test results of the FPS at the time of scrolling a page, FPS at the time of opening a message, the number of times of adding a message, FPS at the time of cutting an image, FPS at the time of adding a message, and the number of times of rendering a page are respectively 40 fps, 35 fps, 30, 45 fps, 42 fps and 25. The weighted average is:

$$\frac{40*1.25+35*1.25+30*1+45*1+42*0.75+25*0.75}{1.25+1.25+1+1+0.75+0.75}=36.5$$

The comprehensive score of the page control is:

$$36.5*1000=36500$$

S504: determining the operation performance of the page control according to the comprehensive score.

In a specific implementation, a threshold may be preset. After the comprehensive score of the page control is obtained, the comprehensive score may be compared with the threshold. If the comprehensive score is larger than or equal to the threshold, the operation performance of the page control is determined to be excellent.

For example, if the threshold is set as 30000 and the comprehensive score of the page control is 36500, the comprehensive score is larger than the threshold, and thus the performance of the page control is determined to be excellent.

In the embodiment of the present disclosure, each of the multiple evaluation dimensions for the page control is tested. The multiple evaluation dimensions may comprise at least one of an FPS (Frames Per Second) at the time of scrolling a page, an FPS at the time of opening a message, the number of times of adding a message, an FPS at the time of cutting an image, an FPS at the time of adding a message, and the number of times of rendering a page. The test result of each evaluation dimension is determined. The operation performance of the page control is determined according to the test result of each evaluation dimension. The credibility of the evaluation result is improved by testing the page control in multiple dimensions and using the test result of each dimension to comprehensively evaluate the operation performance of the page control.

Figure 6:
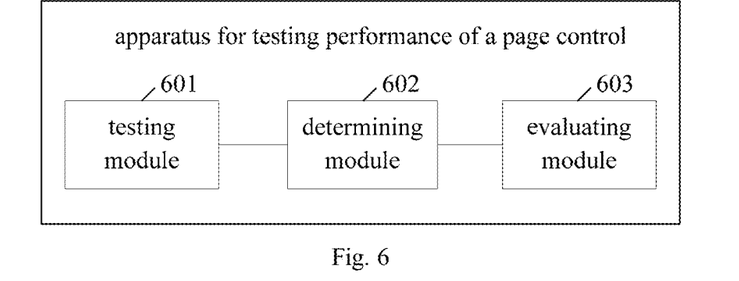
FIG. 6 is a structural schematic diagram of an apparatus for testing performance of a page control according to an embodiment of the present disclosure.

Referring to FIG. 6, FIG. 6 provides a structural schematic diagram of an apparatus for testing performance of a page control. As shown in the figure, the apparatus in the embodiment of the present disclosure comprises the following modules.

A testing module 601 is configured to test each of multiple evaluation dimensions for a page control. The multiple evaluation dimensions may comprise at least one of: an FPS (Frames Per Second) at the time of scrolling a page, an FPS at the time of opening a message, the number of times of adding a message, an FPS at the time of cutting an image, an FPS at the time of adding a message, and the number of times of rendering a page. The testing method may comprises the following optional ways.

In a first optional way, the FPS at the time of scrolling a page is tested. The test comprises: recording, upon the completion of page loading, the currently displayed content on the screen as initial display content of the screen; scrolling the page up or down; clicking, after the page has been scrolled a distance or for a period of time, on any position of the screen to stop scrolling the page; scrolling the page in a reverse direction; and stopping scrolling the page when the screen is currently displaying a content that is consistent with the initial display content of the screen, wherein the distance or the period of time may be of any length.

For example, FIG. 2 shows a complete process of page scrolling during the test of the FPS at the time of scrolling a page. Image-text messages 1-6 are initially displayed on the screen. The page is then scrolled downward to view other image-text messages included in the page until an image-text message 9 is displayed on the screen. The downward scrolling is hereby stopped, and the page is scrolled back until the image-text messages 1-6 are displayed again on the screen.

In a second optional way, the FPS at the time of opening a message is tested. The test comprises: selecting, after the scrolling of the page is stopped, one message from all the image-text messages included in the page; clicking on the selected message to display the detailed content of the selected message in a window with animation; and clicking on the window with animation to close the selected message after the detailed content is completely displayed.

For example, a message is selected from a list of image-text messages in the current page, the content of which is a section of video information; the video begins to play after the clicking on the selected message, and the selected message is closed by clicking on the video window, after the video is played completely.

In a third optional way, the FPS at the time of cutting an image is tested. The test comprises: selecting one from all the images included in the page as a target image to be cut, by long-pressing this image. The long-pressing may refer to that the image is pressed for 1 second. At this time, an image editing interface may be entered. An image cutting mode may then be entered by long-pressing the target image again. In the imaging cutting mode, an image cutting scheme is determined, and the target image is cut in response to the clicking on a cutting button. A new image obtained by the cutting is processed, for example, stored or discarded. Finally, the image editing interface is closed in response to the clicking on the exit button.

For example, an image editing interface of the page is entered while the target image is determined. As shown in FIG. 3(A), the image editing interface comprises a target image, a menu bar and an exit button. Then, the target image is long-pressed to enter the image cutting mode. As shown in FIG. 3(B), a highlighted rectangular area appears on the target image, and eight movable points are distributed along the inner edges of the rectangular area. The eight movable points may be respectively moved to determine the cutting scheme, such that the image part displayed in the highlighted area will serve as the new image obtained from the cutting. A CUT button on the image editing interface is clicked after the image in the highlighted area is determined as meeting a cutting expectation, so that a cutting operation on the target image is performed. The new image is then stored. Finally, the exit button at the right upper corner of the image cutting interface is clicked to close the image editing interface is closed.

In a fourth optional way, the FPS at the time of adding a message and the number of times of adding a message are tested. The test comprises, as shown in FIG. 4, clicking a message addition button for adding a message onto the page, so as to enter a message editing interface of the page; inputting, into a message editing box, message content, which may be one image, and a section of text or video; and then clicking, after the message content has been input, the "addition" button at the right upper corner of the message editing interface, and finally displaying the added message at the top position of the page.

In a fifth optional way, the number of times of rendering a page is tested. The test comprises: using AJAX technology to read JSON (JavaScript Object Notation) data of the page; and rendering the page, wherein the rendering process is a process of converting a page represented in codes into a page in image-text form and displaying the page. The operation for rendering a page may be implemented by a browser. A successful display of the page on the screen indicates the end of rendering the page.

It is appreciated that to avoid testing errors due to human factors, all the above operations (e.g., scrolling, clicking and long-pressing) are implemented by simulated clicking through assisting functions of the system.

A determining module 602 is configured to determine the test result of each of the evaluation dimensions, wherein the determining of the test result comprises the following several optional methods:

In a first optional method, the test result of the FPS at the time of scrolling a page is determined. The method comprises: recording a duration from the beginning of the scrolling of a page to the end of the scrolling of the page in the testing process; obtaining, through an API (Application Programming Interface), the number of times that the page is refreshed in the duration from the beginning of the scrolling of a page to the end of the scrolling of the page; and calculating the quotient of the number of times that the page is refreshed divided by the duration as the test result of the FPS at the time of scrolling a page.

For example, in the process of scrolling a page as shown in FIG. 2, the recorded duration from the beginning of the scrolling of the page to the end of the scrolling of the page is 2000 ms, and the number of times that the page is refreshed in the duration from the beginning of the scrolling of the page to the end of the scrolling of the page, which is obtained through the API of window.requestAnimationFrame in JavaScript, is 60. As such, the test result of FPS at the time of scrolling a page is 60/(2000/1000)=30 frames per second (fps).

In a second optional method, the test result of the FPS at the time of opening a message is determined. The method comprises: recording the duration from the clicking on a selected message to the closing of the selected message in the test process; obtaining, through an API, the number of times that the page is refreshed in that duration from the clicking on a selected message to the closing of the selected message, and calculating the quotient of the number of times that the page is refreshed divided by the duration as the test result of the FPS at the time of opening a message.

For example, the recorded duration from the clicking on a selected message to the closing of the selected message is 1500 ms, and the number of times that the page is refreshed in the duration from the clicking on a selected message to the returning of the selected message to a state before the clicking, which is obtained through the API of window.RequestAnimationFrame in JavaScript, is 60. Thus, the test result of FPS at the time of opening a message is 60/(1500/1000)=40 fps.

In a third optional method, the test result of the FPS at the time of cutting an image is determined. The method comprises: recording the duration from the long-pressing on the target image to the closing of the image editing interface in the image cutting process; obtaining, through an API, the number of times that the page is refreshed in the duration from the clicking on the target image to the closing of the image editing interface, and calculating the quotient of the number of times that the page is refreshed divided by the duration as the test result of the FPS at the time of cutting an image. For example, the recorded duration from the clicking on the target image to the closing of the image editing interface is 1020 ms, and the page is refreshed 40 times in the duration of 1020 ms. Thus, the test result of the FPS at the time of cutting an image is 40/(1020/1000)=39.2 fps.

In a fourth optional method, the test result of FPS at the time of adding a message and the number of times of adding a message is determined. The method comprises: recording the duration from the clicking on a message addition button to the displaying of the added message on the top of the page in the testing process; obtaining, through an API, the number of times that the page is refreshed in the duration from the clicking on a message addition button to the displaying of the added message on the top of the page; calculating the quotient of the number of times that the page is refreshed divided by the duration as the test result of the FPS at the time of adding a message; and calculating the quotient of a first preset duration divided by the recorded duration as the test result of the number of times of adding a message, wherein the first preset duration may be any predetermined duration, such as 10 ms or 20 ms.

In the fifth optional method, the test result of the number of times of rendering a page is determined. The method comprises: recording the duration from the reading of JSON data of the page to the end of the rendering of the page, and calculating the quotient of the second preset duration divided by the recorded duration as the test result of the number of times of rendering a page, wherein the second preset duration may be any predetermined duration, such as 100 ms or 80 ms.

An evaluating module 603 is configured to determine the operation performance of the page control according to the test result of each of the evaluation dimensions.

In a specific implementation, a linear weighted sum of the test results of the evaluation dimensions may be calculated, wherein a sum of the weights of all the evaluation dimensions equals to 1. The magnitude of the weight of each evaluation dimension is determined according to the importance thereof. The weights of the FPS at the time of scrolling a page, FPS at the time of opening a message, the number of times of adding a message, FPS at the time of cutting an image, FPS at the time of adding a message, and the number of times of rendering a page may be respectively set as 0.25, 0.25, 0.15, 0.15, 0.1 and 0.1. The product of the calculated linear weighted sum and 1000 is taken as the comprehensive score of the page control. If the comprehensive score of the page control exceeds a preset threshold, the operation performance of the page control is determined to be excellent.

For example, the test results of the FPS at the time of scrolling a page, FPS at the time of opening a message, the number of times of adding a message, FPS at the time of cutting an image, FPS at the time of adding a message, and the number of times of rendering a page are respectively 40 fps, 35 fps, 30, 45 fps, 42 fps and 25. The linear weighted sum is:

40*0.25+35*0.25+30*0.15+45*0.15+42*0.1+ 25*0.1=36.7

The comprehensive score of the page control is:

36.7*1000=36700

If the threshold is set as 30000, the comprehensive score of 36700 is larger than the threshold, thus the performance of the page control is determined to be excellent.

Optionally, a weighted average of the test results of all the evaluation dimensions may be calculated, wherein the sum of weights of all the evaluation dimensions does not exceed the total number of the evaluation dimensions. The magnitude of the weight of each of the evaluation dimensions is determined according to its importance. The weights of the FPS at the time of scrolling a page, FPS at the time of opening a message, the number of times of adding a message, FPS at the time of cutting an image, FPS at the time of adding a message, and the number of times of rendering a page may be respectively set as 1.25, 1.25, 1, 1, 0.75 and 0.75. The product of the calculated weighted average and 1000 is taken as the comprehensive score of the page control. If the comprehensive score of the page control exceeds a preset threshold, the operation performance of the page control is determined to be excellent.

For example, the test results of the FPS at the time of scrolling a page, FPS at the time of opening a message, the number of times of adding a message, FPS at the time of cutting an image, FPS at the time of adding a message, and the number of times of rendering a page are respectively 40 fps, 35 fps, 30, 45 fps, 42 fps and 25. The weighted average is:

$$\frac{40*1.25+35*1.25+30*1+45*1+42*0.75+25*0.75}{1.25+1.25+1+1+0.75+0.75}=36.5$$

The comprehensive score of the page control is:

36.5*1000=36500

If the threshold is set as 30000, the comprehensive score of 36500 is larger than the threshold, thus the performance of the page control is determined to be excellent.

In the embodiment of the present disclosure, each of the multiple evaluation dimensions for the page control is tested. The multiple evaluation dimensions may comprise at least one of an FPS (Frames Per Second) at the time of scrolling a page, an FPS at the time of opening a message, the number of times of adding a message, an FPS at the time of cutting an image, an FPS at the time of adding a message, and the number of times of rendering a page. The test result of each evaluation dimension is determined. The operation performance of the page control is determined according to the test result of each evaluation dimension. The credibility of the evaluation result is improved by testing the page control in multiple dimensions and using the test result of each dimension to comprehensively evaluate the operation performance of the page control.

Figure 7:
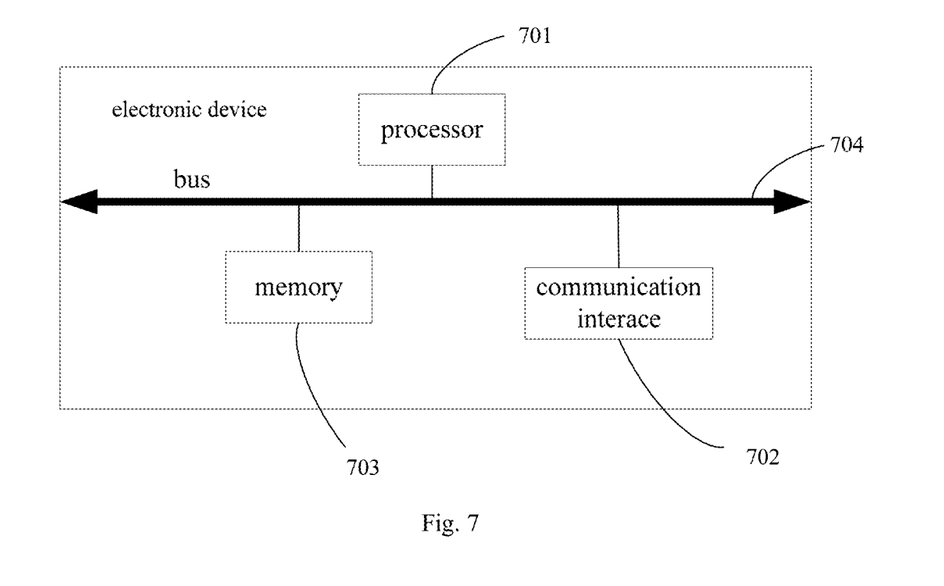
FIG. 7 is a structural schematic diagram of an electronic device according to an embodiment of the present disclosure.

Referring to FIG. 7, FIG. 7 illustrates a structural schematic diagram of an electronic device according to an embodiment of the present disclosure. As shown in FIG. 7, the electronic device may comprise: at least one processor 701 such as CPU, at least one communication interface 702, at least one memory 703 and at least one bus 704. The bus 704 is used to implement connection and communication between these components. The communication interface 702 of the electronic device in the embodiment of the present disclosure is a wired transmission port or a wireless device (e.g., including an antenna device) for performing signal or data communication with other node devices. The memory 703 may be a high-speed RAM memory or a non-volatile memory, for example, at least one magnetic disk memory. Optionally, the memory 703 may also be at least one remote storage device remotely located from the processor 701. A set of program codes are stored in the memory 703, and the processor 701 is used to call the program codes stored in the memory to perform the following operations:

testing each of multiple evaluation dimensions for a page control, wherein the multiple evaluation dimensions comprise at least one of: an FPS (Frames Per Second) at the time of scrolling a page, an FPS at the time of opening a message, the number of times of adding a message, an FPS at the time of cutting an image, an FPS at the time of adding a message, and the number of times of rendering a page;

determining the test result of each of the evaluation dimensions;

determining the operation performance of the page control according to the test result of each of the evaluation dimensions.

The processor 701 is further configured to perform the following operation processes:

calculating a comprehensive score of the page control according to the test result of each of the evaluation dimensions;

determining the operation performance of the page control according to the comprehensive score.

The processor 701 is further configured to perform the following operation process:

calculating a linear weighted sum of the test results of the evaluation dimensions as the comprehensive score of the page control.

The processor 701 is further configured to perform the following operation process:

determining the operation performance of the page control to be excellent, if the comprehensive score of the page control exceeds a preset threshold.

The processor 701 is further configured to perform the following operation processes:

obtaining a first duration from the beginning of the scrolling of a page to the end of the scrolling of the page, and a first number of times that the page is refreshed for the first duration;

calculating the quotient of the first number of times that the page is refreshed divided by the first duration as the test result of the FPS at the time of scrolling a page.

The processor 701 is further configured to perform the following operation processes:

obtaining a second duration from the opening of a message to the closing of the message, and a second number of times that the page is refreshed for the second duration;

calculating the quotient of the second number of times that the page is refreshed divided by the second duration as the test result of the FPS at the time of opening a message.

The processor 701 is further configured to perform the following operation processes:

obtaining a third duration from the beginning of the adding of a message and the displaying of the message;

calculating the quotient of a first preset duration divided by the third duration as the test result of the number of times of adding a message.

The processor 701 is further configured to perform the following operation processes:

obtaining a fourth duration from the beginning of the selection of a target image and the completing of the cutting of the target image, and a third number of times that the page is refreshed for the fourth duration;

calculating the quotient of the third number of times that the page is refreshed divided by the fourth duration as the test result of the FPS at the time of cutting an image.

The processor 701 is further configured to perform the following operation processes:

obtaining a fifth duration from the beginning of the reading of data of the page and the completing of the rendering of the page;

calculating the quotient of a second preset duration divided by the fifth duration as the test result of the number of times of rendering a page.

The processor 701 is further configured to perform the following operation processes:

obtaining a sixth duration from the beginning of the adding of a message to the displaying of the message, and a fourth number of times that the page is refreshed for the sixth duration;

calculating the quotient of the fourth number of times that the page is refreshed divided by the sixth duration as the test result of the FPS at the time of adding a message.

It is appreciated that embodiments of the present disclosure also provide a storage medium for storing an application which, when being executed, performs operations, which are performed by the electronic device, in the method for testing the performance of a page control as shown in FIG. 1 and FIG. 5.

It is appreciated that embodiments of the present disclosure also provides an application which, when being executed, performs operations, which are performed by the electronic device, in the method for testing the performance of a page control shown in FIG. 1 and FIG. 5.

It is appreciated that the method embodiments above are, for ease of description, described as a combination of a series of actions. Those skilled in the art would appreciated that the present disclosure is not limited to the described order of actions because some processes may be performed in other orders or simultaneously according to the present disclosure. Secondly, those skilled in the art would appreciate the embodiments described in the description are merely preferred embodiments, and the involved actions and modules may not be necessary for the present disclosure.

In the above embodiments, all the embodiments are focus on different portions, and reference may be made to related depictions in other embodiments for portions which are not described in detail in a certain embodiment.

Those skilled in the art may understand all or a part of the steps of various methods of the above embodiments may be implemented by a hardware according to the instructions of a program. The program may be stored in a computer-readable storage medium. The storage medium may comprise: a flash memory, a Read-Only Memory (ROM), a Random Access Memory (RAM), a magnetic disk, an optical disk, or the like.

The method and apparatus for testing performance of a page control and the electronic device according to embodiments of the present disclosure are described above in detail. Specific examples are used herein to illustrate principles and implementation of the present disclosure. The above illustration of the embodiments are only used for facilitating the understanding of the method of the present disclosure and the core concept thereof. In addition, variations may be made in terms of implementation and application by those of ordinary skill in the art according to the spirit of the present disclosure. In conclusion, the detailed description of the present disclosure should not be construed as limiting the present disclosure.

Throughout the description, terms such as "an embodiment", "some embodiments", "an example", "a specific example", or "some examples" mean that a particular feature, structure, material, or characteristic described in connection with the embodiment or example may be included in at least one embodiment or example of the present disclosure. Thus, throughout the description, illustrative expressions of these terms do not necessarily refer to the same embodiment or example of the present disclosure. Furthermore, the described particular features, structures, materials, or characteristics may be combined in any suitable manner in one or more embodiments or examples. In addition, in the case of non-contradiction, those skilled in the art may incorporate or combine the different embodiments or examples as described and features thereof.

In addition, terms "first" and "second" are only used for illustration purpose and should not be understood as indicating or implying relative importance or implicitly indicating the number of the technical features. Thus, a feature defined by "first" and "second" may explicitly or implicitly indicate that at least one of the feature is included. In the description of the present disclosure, "a plurality of" means at least two, for example two, three or the like, unless otherwise expressively defined.

Any process or method depicted in the flow charts or otherwise described herein may be understood to comprise one or more modules, sections or parts of the executable codes for implementing particular logic functions or steps of a processes. Moreover, the scope of preferred embodiments of the present disclosure may comprise other implementations, in which the functions are performed in an order different from what is depicted or discussed. For example, the functions may be performed substantially simultaneously or in an reverse order. All these should be understood by those skilled in the art to which embodiments of the present disclosure pertains.

The logic and/or step illustrated in a flow chart or otherwise described herein may be considered as, for example, a particular series of executable instructions for implementing logical functions, and may be embodied in any computer readable medium in order to be used by or in combination with an instruction executing system, device or equipment (for example, system based on computers, system comprising processors or other systems capable of obtaining instructions and executing the obtained instructions). In terms of present disclosure, the "computer readable medium" may be any device that may include, store, communicate, transmit or transfer programs to be used by the instruction execution system, device or equipment. Or otherwise, the "computer readable medium" may be any device used in combination of the instruction execution system, device or equipment. More specific examples (non-exhaustive) of the computer readable medium comprise but are not limited to: an electronic connection component (an electronic device) with one or more wires, a portable computer diskette (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium with the program printed thereon. The instructions may be electrically obtained by optically scanning the paper or other appropriate medium, and then editing, decrypting or otherwise processing with other appropriate methods when necessary, and then stored in a computer memory.

It should be understood that each part of the present disclosure may be implemented by hardware, software, firmware or combinations thereof. In the embodiments described above, the plurality of steps or methods may be implemented by the software or firmware stored in the memory and executed by an appropriate instruction execution system. For example, if it is implemented by hardware, likewise in another embodiment, the steps or methods may be implemented by any or a combination of the following techniques known in the art: a discrete logic circuit having logic gate circuits for implementing a logic function of a data signal, an application-specific integrated circuit having appropriate combined logic gate circuits, a programmable gate array (PGA), a field programmable gate array (FPGA), and so on.

It should be understood by those skilled in the art that all or a part of the steps in the method of the above embodiments can be implemented hardwares instructed by programs, which may be stored in a computer readable storage medium and include any or a combination of the steps of the method when the program is executed.

In addition, the functional units of the embodiments of the present disclosure may be integrated in a processing module, or physically separated. Or otherwise, two or more units may be integrated in a module. The integrated module may be implemented in the form of hardware or software function modules. The integrated module may be stored in a computer readable storage medium, when being implemented in the form of software function module and sold or used as a standalone product.

The storage medium mentioned above may be read-only memories, magnetic disks, optical disks or the like. Although embodiments of the present disclosure have been shown and described above, it would be appreciated by those skilled in the art that the above embodiments are exemplary and cannot be construed to limit the present disclosure. Those skilled in the art can make changes, modifications, substitutions and variations on the above embodiments without departing from the scope of the present disclosure.

What is claimed is:

1. A method for testing performance of a page control, which is applicable to an electronic device, comprising:
    testing each of multiple evaluation dimensions for a page control, the multiple evaluation dimensions comprising an FPS (Frames Per Second) at the time of scrolling a page, as well as at least one of an FPS at the time of opening a message, the number of times of adding a message, an FPS at the time of cutting an image, an FPS at the time of adding a message, and the number of times of rendering a page;
    determining a test result of each of the evaluation dimensions; and
    determining operation performance of the page control according to all test results for the multiple evaluation dimensions;
    wherein determining the test result of each of the evaluation dimensions comprises determining a test result of the FPS at the time of scrolling a page, comprising:
        obtaining a duration from the beginning of the scrolling of a page to the end of the scrolling of the page, and a number of times that the page is refreshed for the duration; and
        calculating a quotient of the number of times that the page is refreshed divided by the duration as the test result of the FPS at the time of scrolling a page.

2. The method according to claim 1, wherein, determining operation performance of the page control according to the test result of each of the evaluation dimensions comprises:
    calculating a comprehensive score of the page control according to the test result of each of the evaluation dimensions; and
    determining the operation performance of the page control according to the comprehensive score; or
    wherein, calculating a comprehensive score of the page control according to the test result of each of the evaluation dimensions comprises:

calculating a linear weighted sum of the test results of the evaluation dimensions as the comprehensive score of the page control.

3. The method according to claim 2, wherein, determining the operation performance of the page control according to the comprehensive score comprises:
   determining the operation performance of the page control to be excellent, if the comprehensive score of the page control exceeds a preset threshold.

4. The method according to claim 1, wherein, when the multiple evaluation dimensions comprise the FPS at the time of opening a message, determining the test result of each of the evaluation dimensions further comprises determining a test result of the FPS at the time of opening a message, comprising:
   obtaining a duration from the opening of a message to the closing of the message, and a number of times that the page is refreshed for the duration; and
   calculating a quotient of the number of times that the page is refreshed divided by the duration as the test result of the FPS at the time of opening a message.

5. The method according to claim 1, wherein, when the multiple evaluation dimensions comprise the number of times of adding a message, determining the test result of each of the evaluation dimensions further comprises determining a test result of the number of times of adding a message, comprising:
   obtaining a duration from the beginning of the adding of a message to the displaying of the message; and
   calculating a quotient of a preset duration divided by the duration as the test result of the number of times of adding a message.

6. The method according to claim 1, wherein, when the multiple evaluation dimensions comprise the FPS at the time of cutting an image, determining the test result of each of the evaluation dimensions further comprises determining a test result of the FPS at the time of cutting an image, comprising:
   obtaining a duration from the beginning of the selection of a target image to the completing of the cutting of the target image, and a number of times that the page is refreshed for the duration; and
   calculating a quotient of the number of times that the page is refreshed divided by the duration as the test result of the FPS at the time of cutting an image.

7. The method according to claim 1, wherein, when the multiple evaluation dimensions comprise the number of times of rendering a page, determining the test result of each of the evaluation dimensions further comprises determining a test result of the number of times of rendering a page, comprising:
   obtaining a duration from the beginning of the reading of data of the page to the completing of the rendering of the page; and
   calculating a quotient of a preset duration divided by the duration as the test result of the number of times of rendering a page.

8. The method according to claim 1, wherein, when the multiple evaluation dimensions comprise the FPS at the time of adding a message, determining the test result of each of the evaluation dimensions further comprises determining a test result of the FPS at the time of adding a message, comprising:
   obtaining a duration from the beginning of the adding of a message to the displaying of the message, and a number of times that the page is refreshed for the duration; and
   calculating a quotient of the number of times that the page is refreshed divided by the duration as the test result of the FPS at the time of adding a message.

9. An electronic device, comprising: a processor, a memory, a communication interface and a bus, wherein,
   the processor, the memory and the communication interface are connected through the bus to communicate with each other;
   the memory is configured to store executable program codes; and
   the processor is configured to execute a program corresponding to the executable program codes by reading the executable program codes stored in the memory, to perform a process comprising:
      testing each of multiple evaluation dimensions for a page control, the multiple evaluation dimensions comprising an FPS (Frames Per Second) at the time of scrolling a page, as well as at least one of an FPS at the time of opening a message, the number of times of adding a message, an FPS at the time of cutting an image, an FPS at the time of adding a message, and the number of times of rendering a page;
      determining a test result of each of the evaluation dimensions; and
      determining operation performance of the page control according to all test results for the multiple evaluation dimensions;
      wherein determining the test result of each of the evaluation dimensions comprises determining a test result of the FPS at the time of scrolling a page, comprising:
         obtaining a duration from the beginning of the scrolling of a page to the end of the scrolling of the page, and a number of times that the page is refreshed for the duration; and
         calculating a quotient of the number of times that the page is refreshed divided by the duration as the test result of the FPS at the time of scrolling a page.

10. The electronic device according to claim 9, wherein, determining operation performance of the page control according to the test result of each of the evaluation dimensions comprises:
    calculating a comprehensive score of the page control according to the test result of each of the evaluation dimensions; and
    determining the operation performance of the page control according to the comprehensive score; or
    wherein, calculating a comprehensive score of the page control according to the test result of each of the evaluation dimensions comprises:
       calculating a linear weighted sum of the test results of the evaluation dimensions as the comprehensive score of the page control.

11. The electronic device according to claim 10, wherein, determining the operation performance of the page control according to the comprehensive score comprises:
    determining the operation performance of the page control to be excellent, if the comprehensive score of the page control exceeds a preset threshold.

12. The electronic device according to claim 9, wherein, when the multiple evaluation dimensions comprise the FPS at the time of opening a message, determining the test result of each of the evaluation dimensions further comprises determining a test result of the FPS at the time of opening a message, comprising:

obtaining a duration from the opening of a message to the closing of the message, and a number of times that the page is refreshed for the duration; and calculating a quotient of the number of times that the page is refreshed divided by the duration as the test result of the FPS at the time of opening a message.

13. The electronic device according to claim 9, wherein, when the multiple evaluation dimensions comprise the number of times of adding a message, determining the test result of each of the evaluation dimensions further comprises determining a test result of the number of times of adding a message, comprising:

obtaining a duration from the beginning of the adding of a message to the displaying of the message; and calculating a quotient of a preset duration divided by the duration as the test result of the number of times of adding a message.

14. The electronic device according to claim 9, wherein, when the multiple evaluation dimensions comprise the FPS at the time of cutting an image, determining the test result of each of the evaluation dimensions further comprises determining a test result of the FPS at the time of cutting an image, comprising:

obtaining a duration from the beginning of the selection of a target image to the completing of the cutting of the target image, and a number of times that the page is refreshed for the duration; and calculating a quotient of the number of times that the page is refreshed divided by the duration as the test result of the FPS at the time of cutting an image.

15. The electronic device according to claim 9, wherein, when the multiple evaluation dimensions comprise the number of times of rendering a page, determining the test result of each of the evaluation dimensions further comprises determining a test result of the number of times of rendering a page, comprising:

obtaining a duration from the beginning of the reading of data of the page to the completing of the rendering of the page; and calculating a quotient of a preset duration divided by the duration as the test result of the number of times of rendering a page.

16. The electronic device according to claim 9, wherein, when the multiple evaluation dimensions comprise the FPS at the time of adding a message, determining the test result of each of the evaluation dimensions further comprises determining a test result of the FPS at the time of adding a message, comprising:

obtaining a duration from the beginning of the adding of a message to the displaying of the message, and a number of times that the page is refreshed for the duration; and calculating a quotient of the number of times that the page is refreshed divided by the duration as the test result of the FPS at the time of adding a message.

17. A non-transitory computer-readable storage medium storing multiple instructions, wherein the instructions are loaded by a processor to cause the processor to perform a process comprising:

testing each of multiple evaluation dimensions for a page control, the multiple evaluation dimensions comprising an FPS (Frames Per Second) at the time of scrolling a page, as well as at least one of an FPS at the time of opening a message, the number of times of adding a message, an FPS at the time of cutting an image, an FPS at the time of adding a message, and the number of times of rendering a page;

determining a test result of each of the evaluation dimensions; and determining operation performance of the page control according to all test results for the multiple evaluation dimensions;

wherein determining the test result of each of the evaluation dimensions comprises determining a test result of the FPS at the time of scrolling a page, comprising:

obtaining a duration from the beginning of the scrolling of a page to the end of the scrolling of the page, and a number of times that the page is refreshed for the duration; and calculating a quotient of the number of times that the page is refreshed divided by the duration as the test result of the FPS at the time of scrolling a page.

18. The non-transitory computer-readable storage medium according to claim 17, wherein, determining operation performance of the page control according to the test result of each of the evaluation dimensions comprises:

calculating a comprehensive score of the page control according to the test result of each of the evaluation dimensions; and determining the operation performance of the page control according to the comprehensive score; or wherein, calculating a comprehensive score of the page control according to the test result of each of the evaluation dimensions comprises:

calculating a linear weighted sum of the test results of the evaluation dimensions as the comprehensive score of the page control.

* * * * *